US009268831B2

(12) United States Patent
Francis

(10) Patent No.: US 9,268,831 B2
(45) Date of Patent: Feb. 23, 2016

(54) SYSTEM AND METHOD FOR EXTRACTING USER SELECTED DATA FROM A DATABASE

(75) Inventor: Michael Francis, Marlow (GB)

(73) Assignee: Lightfoot Solutions Group Limited, Bracknell (GB)

(*) Notice: Subject to any disclaimer, the term of this patent is extended or adjusted under 35 U.S.C. 154(b) by 777 days.

(21) Appl. No.: 12/229,902

(22) Filed: Aug. 27, 2008

(65) Prior Publication Data
US 2009/0077008 A1 Mar. 19, 2009

Related U.S. Application Data

(63) Continuation-in-part of application No. 10/586,004, filed as application No. PCT/GB2005/000074 on Jan. 12, 2005, now abandoned.

(30) Foreign Application Priority Data

Jan. 12, 2004 (GB) .................................. 0400569.0

(51) Int. Cl.
G06F 17/30 (2006.01)

(52) U.S. Cl.
CPC .............................. G06F 17/30569 (2013.01)

(58) Field of Classification Search
CPC ............... G06F 17/30592; G06F 17/30333; G06F 17/31; G06F 17/32; G06F 17/30398
USPC .................................................. 707/722
See application file for complete search history.

(56) References Cited

U.S. PATENT DOCUMENTS

| | | | |
|---|---|---|---|
| 5,724,577 A * | 3/1998 | Exley et al. | |
| 5,956,744 A | 9/1999 | Robertson et al. | |
| 5,974,407 A * | 10/1999 | Sacks | |
| 6,047,358 A | 4/2000 | Jacobs | |
| 6,161,103 A * | 12/2000 | Rauer | G06Q 30/02 |
| 6,345,272 B1 * | 2/2002 | Witkowski | G06F 17/30457 706/16 |
| 6,366,922 B1 * | 4/2002 | Althoff | G06F 17/30592 707/706 |
| 6,442,560 B1 * | 8/2002 | Berger | G06F 17/18 |
| 6,480,857 B1 * | 11/2002 | Chandler | G06F 17/30595 707/792 |
| 6,487,546 B1 * | 11/2002 | Witkowski | G06F 17/30595 |
| 6,684,207 B1 * | 1/2004 | Greenfield | G06F 17/3041 |
| 6,742,084 B1 | 5/2004 | Defouw et al. | |
| 6,772,199 B1 | 8/2004 | Keller et al. | |
| 6,952,688 B1 * | 10/2005 | Goldman | G06N 5/022 706/45 |
| 7,657,451 B2 * | 2/2010 | Dubois | G06Q 10/00 705/7.41 |
| 2001/0002456 A1 | 5/2001 | Ikeuchi et al. | |

(Continued)

OTHER PUBLICATIONS

Jim Challenger, et al., A Scalable System for Consistently Caching Dynamic Web Data, Mar. 21-25, 1999, IEEE INFOCOM, vol. 1, pp. 294-204.

(Continued)

Primary Examiner — Tony Mahmoudi
Assistant Examiner — Michael Le
(74) Attorney, Agent, or Firm — Baker & Hostetler LLP

(57) ABSTRACT

A system and method are provided for receiving extracted data from a transaction database. Extracted data is transformed into a predefined structure and used to populate a database. A set of measures are then provided for interrogating the database and these may be displayed to the user with dimensions which maybe applied to filter the data. Data presented to a user is relevant to his or her area of activity. The data is periodically refreshed and signals are presented in the data relating to issues requiring further investigation.

8 Claims, 4 Drawing Sheets

(56) References Cited

U.S. PATENT DOCUMENTS

| | | | | |
|---|---|---|---|---|
| 2001/0042240 A1* | 11/2001 | Ng | ................... | G06F 8/427 717/122 |
| 2002/0147895 A1 | 10/2002 | Glance et al. | | |
| 2003/0074222 A1* | 4/2003 | Rosow | ................... | G06Q 10/02 705/2 |
| 2003/0163469 A1* | 8/2003 | Garth | ................ | G06F 17/30286 |
| 2003/0177443 A1* | 9/2003 | Schnelle et al. | ............... | 715/513 |
| 2004/0243593 A1* | 12/2004 | Stolte et al. | ................... | 707/100 |
| 2005/0138020 A1* | 6/2005 | Lokken | ................... | 707/3 |

OTHER PUBLICATIONS

Shaul Dar, et al., Semantic Data Caching and Replacement, 1996, Morgam Kaugmann Publishers Inc., VLDB '96, pp. 330-341.

International Search Report and Written Opinion dated Sep. 30, 2005.

"Automating Component Integration for Web-Based Data Analysis", Penix, J., et al., IEEE Mar. 2000, vol. 4, pp. 465-473.

"Active Query Caching for Database Web Servers", Luo, et al., Online!, May 2000, pp. 92-104.

"Workflow-Based Process Monitoring and Controlling—Technical and Organizational Issues", Zur Muehlen, et al., IEEE, Jan. 2000, pp. 1972-1981.

"Statistical Process Control for Solder Deposition and Yield Enhancement", Muthaiyan, et al., IEEE Dec. 2000, pp. 212-217.

"SPC User Interface Design", IBM Technical Disclosure Bulletin, vol. 35, No. 6, Nov. 1992, pp. 165-169.

Penix, J. et al., "Automating Component Integration for Web-Based Data Analysis", Aerospace Conference Proceedings IEEE, V4, Mar. 18, 2000, 465-473.

Luo, Q. et al., "Active Query Caching for Database Web Servers", D. Suciu and G. Vossen (Eds.), WebDB 2000, LNCS 1997, pp. 92-104, 2001, Springer-Verlag Berlin Heidelberg.

Zur Muehlen, M. et al., "Workflow-based Process Monitoring and Controlling—Technical and Organizational Issues", Proceedings of the $33^{rd}$ Hawaii International Conference on System Sciences—2000 IEEE, pp. 1-10.

Muthaiyan, R. et al., "Statistical Process Control for Solder Deposition and Yield Enhancement", 2002 Electronics Packaging Technology Conference, IEEE, pp. 212-217.

IBM Technical Disclosure Bulletin, vol. 35, No. 6, Nov. 1992, pp. 165-169.

\* cited by examiner

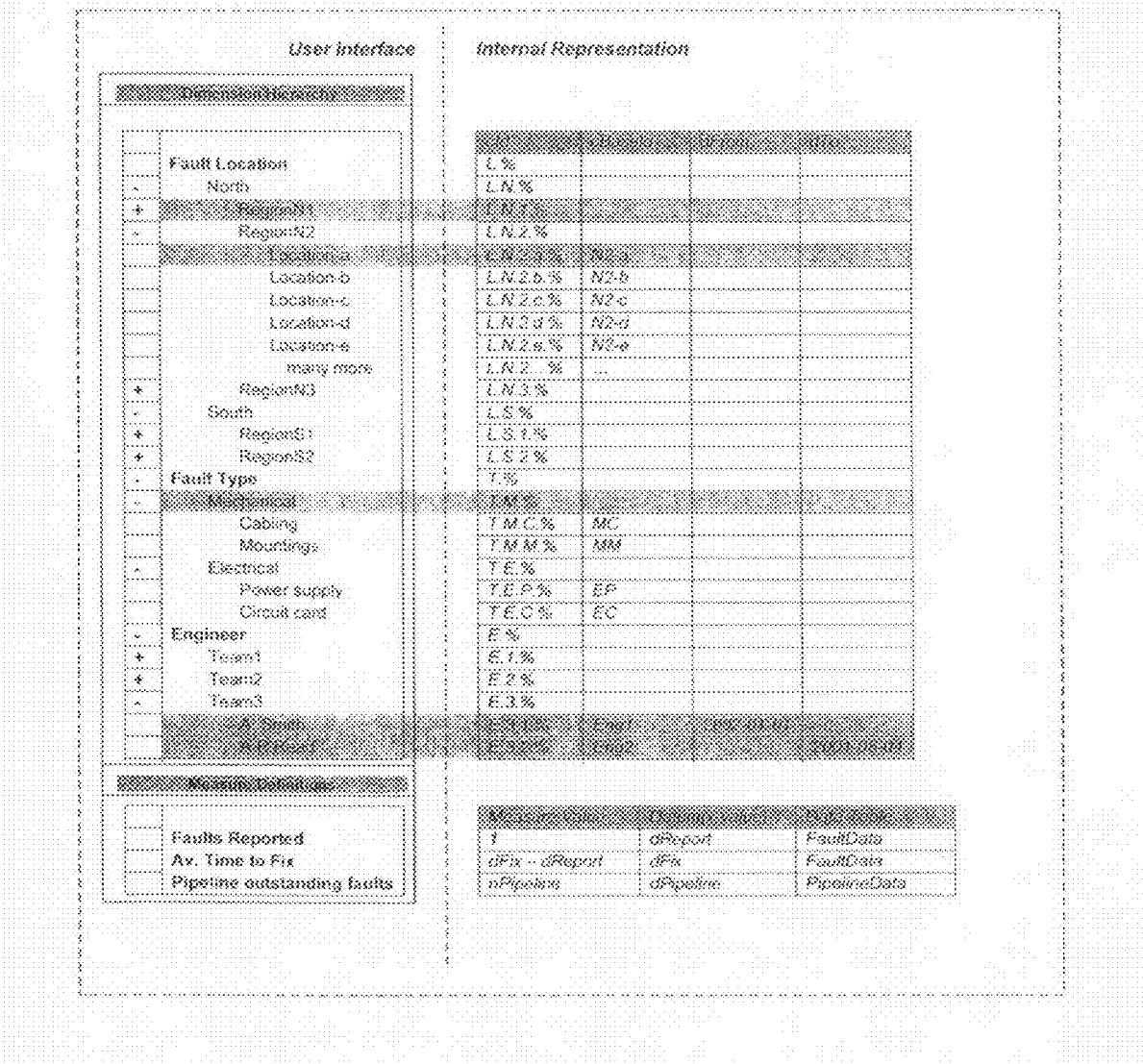

Fig 2: Example Measure Data Tables

*FaultData*

| Column Name | Data Type | Indexed | Notes |
|---|---|---|---|
| cFaultId | varchar(255) | Y | Primary Key |
| dReport | Datetime | N | Date on which fault reported |
| dFix | Datetime | N | Date on which fault fixed (NULL if not fixed) |
| cLocId | varchar(255) | Y | Location of fault |
| cEngId | varchar(255) | Y | Engineer assigned to fault |
| cTypeId | varchar(255) | Y | Type of fault |

*PipelineData*

| Column Name | Data Type | Indexed | Notes |
|---|---|---|---|
| dPipeline | Datetime | N | Snapshot date |
| nPipeline | number | N | Num of faults in pipeline for this loc and type |
| cLocationId | varchar(255) | Y | Location of fault |
| cTypeId | varchar(255) | Y | Type of fault |

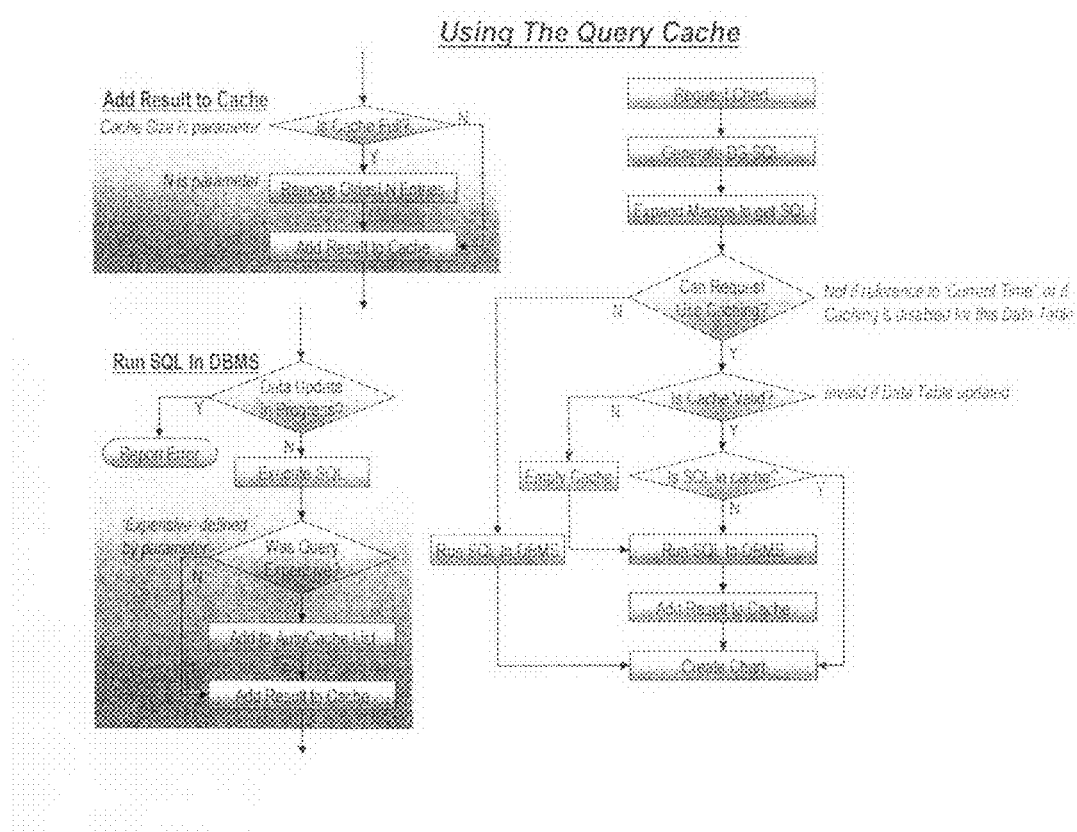
Fig 3a: Caching and auto-caching flow charts

Fig 3b
Fig 3c
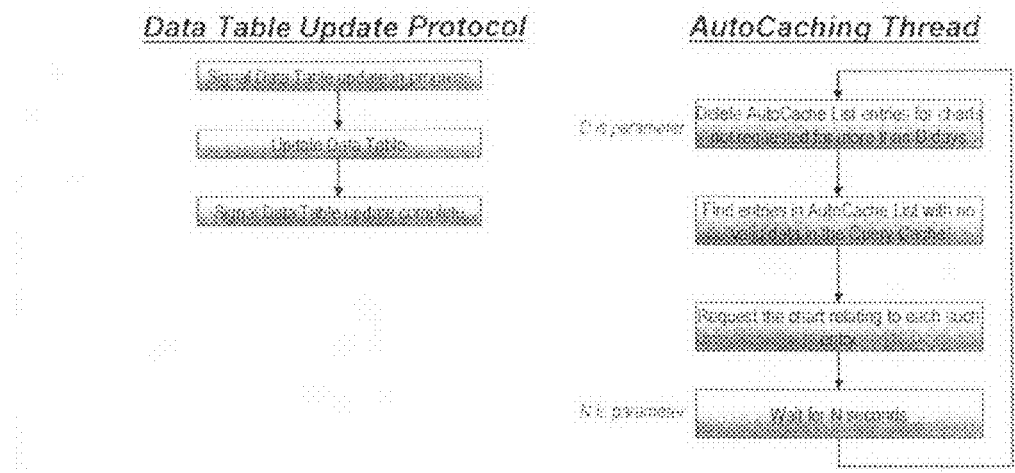
Fig 4
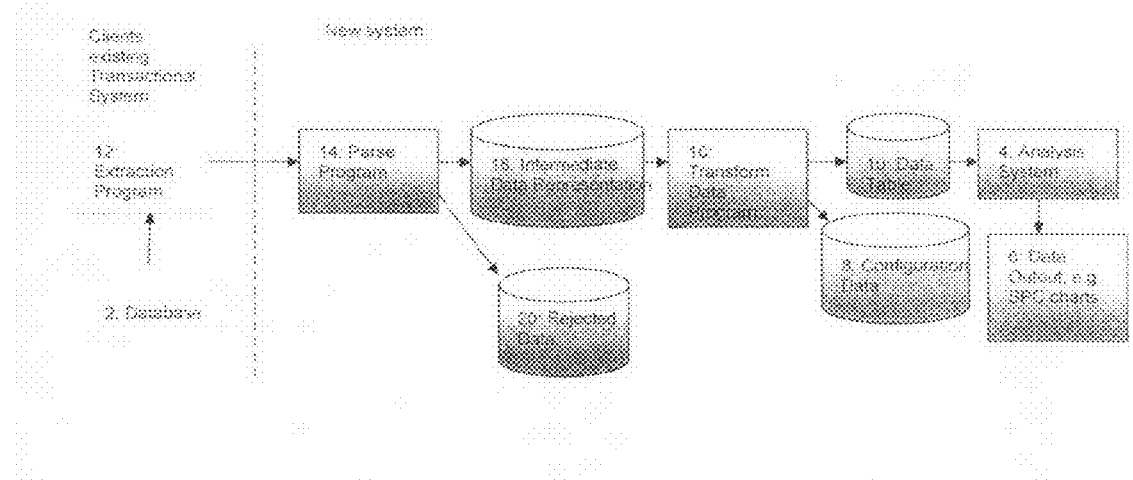

SYSTEM AND METHOD FOR EXTRACTING USER SELECTED DATA FROM A DATABASE

This application is a Continuation-In-Part of U.S. patent application Ser. No. 10/586,004 now abandoned, the disclosure of which is incorporated by reference herein, which is the National Stage of International Application No. PCT/GB2005/000074, filed Jan. 12, 2005.

FIELD OF THE INVENTION

This invention relates to analysis of data and presentation of that data using a statistical analysis technique called statistical process control. It is applicable to analysis of data of any sort that is susceptible to a predefined method of statistical analysis and to the visual presentation of the results of that analysis, primarily in graphical as well as in tabular form, whereby data maybe manipulated and displayed by a user in a desired manner.

BACKGROUND TO THE INVENTION

Ever since the concept of a process, or indeed any measurable activity, has existed there has been the desire to measure it and improve upon it. In the modern world we encounter processes everywhere from ordering a sandwich to the building of a car. Any of these processes can be graphically monitored by looking at some measure plotted against the relevant processes dimension, which is typically time, but could be any other dimension such as length.

In the 1950's a statistician called Deming took this idea to the manufacturing industry and showed that by applying a statistical rule to the data being displayed it was possible to show on the chart those points which were part of the normal variability of a process and those that were outside. These charts utilise three extra lines superimposed on top of the data, an average line and top and bottom process guidelines, the position of these lines on the chart being derived from the data rather than some arbitrary position. Significant events, by which we mean something out of the ordinary, are those points outside the process guidelines and by investigating and acting upon these; improvements in the performance of the process can be achieved. The charts are well known in the manufacturing industry as Statistical Process Control (SPC) charts and have been widely used in manufacturing since the early 1950's to great effect.

The problem faced by those seeking to implement SPC charts for a process within a business is that there is simply no enterprise wide, simple to configure, general purpose SPC tool that is relevant to every one in an organisation. To date, SPC charts and the software that displays them have remained in the domain of the statisticians and engineers looking after complex manufacturing processes.

In particular, the charts are limited by the lack of a mechanism to filter the charts by one or more dimensions, the representation of measure data that allows the charts to be aggregated and/or drilled down on, and a mechanism to efficiently supply a relevant chart when there is a large amount of data to analyse to any number of users in an organisation, and to insert new measures into the system once the system is in place.

In recent years the application of new IT systems such as ERP and CRM systems have provided firms with an increasing volume of data about their operations and as a result an increasing need to interpret and report on this data. This has resulted in the growth of a related set of technology focused on enterprise wide reporting. These systems include enterprise reporting systems and more specialist systems such as balanced scorecard reporting systems. All these systems seek to provide managers with information about the state of their operations.

These systems have a number of disadvantages. In particular, they require significant expense and effort to set up the data warehouse that most of these systems require and then to configure the reports and to provide ongoing support for the solutions. This in turn has generated its own industry of business intelligence systems support teams who spend their time creating and producing reports for management.

An additional problem that firms are discovering with these systems is that they create an increasing number of static, predefined reports which have to be continually refined to answer the specific questions that managers have about performance. What they cannot do is to allow users to investigate and understand their own performance in any way that they wish in real time because the reports are constrained to do just the job they were programmed to.

In view of this there would be considerable benefit for firms if they could go straight from their transactional data to interactive analysis of performance which allows them to investigate any aspect of performance that their data will support without the need to go through the intermediate stage of building a data warehouse and then defining KPI's and configuring and refining report formats.

SUMMARY OF THE INVENTION

Embodiments of the present invention include a system method and computer program for obtaining measure data from one or more external systems, processing & analysing the data, storing the data, and then displaying the data in the form of a dashboard of dials which link to various charts, including SPC charts. Each person in the organisation has the option to view charts that are uniquely relevant to them. Preferably the system uses standard web browser technology to view the charts and scales from a single user installation to the entire organisation.

Preferred embodiments of the present invention consists of the combination of the following components. Data is extracted from a client's transactional system. It is then transformed into a predefined structure to populate a database which captures the underlying information that is inherent in the data. This database structure is then used to populate the system with a set of measures and data views which can be defined either during initial configuration or subsequently through the use of a user interface. The measures and dimensions are then presented to the users where they can select any combination of measures and dimensions that they wish to explore. A subset of these measures is also displayed via a dashboard of dials on the user interface.

When a user selects a combination of measures and dimensions to investigate, the system then analyses the underlying data using a statistical methodology called Statistical Process Control which identifies statistically significant variations in the underlying data. The results of this analysis are presented to the user in the form of an SPC control chart with any statistically significant points highlighted according to a predefined colour code. The user is then able to undertake further interactive analysis of the data at the click of a mouse using the inbuilt investigative functionality of the software. This includes the ability to examine for process changes, trends, seasonal or cyclical patterns in the data and to look at different data points or different time partitioners (e.g. hourly, weekly, monthly) using a series of drop down menus.

In addition to analysis using SPC charts, the user also has the ability to analyse the data by its underlying dimensionality using a combination of Pareto chart, histograms and benchmark charts and, where the data has geographical references, to see the location of that activity on a map.

The delivery of performance improvements into a business using the above capabilities of the system are achieved by each role in the business following a systematic process to action the information presented by the system. The key roles are the User, Manager and Performance Improvement Analyst.

BRIEF DESCRIPTION OF THE DRAWINGS

Embodiments of the invention will now be described in detail by way of example with reference to the accompanying drawings in which:

FIG. 1 shows a schematic diagram of a set of Dimension Hierarchies and a Measure Hierarchy;

FIG. 2 shows the structure of the Measure Data used in the examples;

FIGS. 3a, b and c shows flow diagrams of the caching/autocaching system embodying a second aspect of the invention; and FIG. 4 is a block diagram of a system embodying the invention.

DETAILED DESCRIPTION OF THE PREFERRED EMBODIMENTS

Wherever data is to be analysed and subsequently represented in SPC charts, the form which the raw data takes must be understood. Frequently there will be a body of historical data, usually stored in some form of database.

FIG. 4 shows a block diagram of the system embodying the invention. This comprises a database 2 of customer data to be analysed. Extraction Program 12 extracts the required data from the customer data and securely transmits the data to a Parsing Program 14 whereby data conforming to the expected transmission format is stored in a intermediate form 18 and data which does not is stored as rejected data 20. A Transform Data Program 16 creates/updates the appropriate Data Table 10 and optionally creates/updates the Configuration Data 8. The Data Table and Configuration Data include measures to be used in analysing the data and various dimensions relating to those measures which can be arranged in some form of dimension hierarchy. An analysis system 4 is provided which sends data after analysis to a data output system which, for example, can produce graphical output such as SPC charts.

When a particular user request is received by the analysis system 4 to produce some form of data output from the underlying database 2, the request will be dependent on the measure and dimension data stored in configuration data. A query will be generated for the data table 10 which will return the data to the analysis system 4 for subsequent output to the data output system 6. Thus, the configuration data is used to filter the data from the data table for user selected output.

In order to produce usable SPC charts, there must first be definition of what is to be represented by the charts. For example, a chart could be defined which shows fault occurrences in a particular piece of equipment across an organisation against time. Fault occurrence would therefore be the measure being considered. In association with this there are various dimensions. These could be e.g. fault location, fault type, or any other that might be required.

In some cases this data will be easily accessible within an existing database. In this case, a system for extracting data from the database can be devised which either links directly to the data in the database, or extracts it to a data table and then links it to construct an SPC chart.

Where the data is present in the database 2 but is not in a suitable format, it is necessary to extract it to a Data Table 10.

The Transform Data Program 16 processes the Intermediate Data 18 such that:

Measure tables are created in the Data Table 10 which allow a Measure (a key performance indicator the business wishes to report on) to be calculated for any time duration at a given point in time (i.e. supports a time series).

The Measure tables include columns for each dimension the business wishes to filter the data by.

The Measure table are updated when additional data is received for the time series.

The dimension tables held in the Configuration Data 8 are updated when additional data is received that contains a change to the dimensions.

It can handle all the required data from the customers systems both now and in the foseable future (i.e. it is a scalable solution).

The specification of a Data Table is dependent on the Measures to be used to analyse it, and on the Dimensions to be used to filter it.

One embodiment of the invention provides a method of storing Dimension information separate from the measure data in such a way that the Dimension Hierarchy (DH) can be modified, including the addition of hierarchy levels, with no change to the Database Schema or measure data, thereby producing a more maintainable database.

The DH is, in general, a set of Dimensions, joined into one hierarchy by grouping nodes, analogous to folders and directories in an Operating System. In the following example, Dimension nodes are shown in bold, and the top-level grouping node in bold italic:

*Organisation*
  Geographical
    North
      Eng01
      Eng02
      ...
    South
      Eng03
      Eng04
      ...
  Functional
    Sales
    Support Typically, Data is related only to the nodes at the bottom of the hierarchies (though due to pre-aggregation or coarse granularity of data, this may not always be the case). Data is considered 'Appropriate' to a node in the hierarchy if it relates to that node or any node below. Data Appropriate to a node is displayed in charts for that node. This method of aggregation allows the hierarchy to be restructured without any Data implications. For example, another level, Country, might be added in the above hierarchy below Geographical, with North and South now coming under each Country. Only the contents of the Database Table representing the Hierarchy itself would need to be modified.

A row of Data relates to a node in the DH, for a given Measure, if the node's cBaseId value matches the value extracted from the data row for the Dimension to which the node belongs. This is the only link between the DH and the Data.

The system provides a mechanism for representing the measure on an SPC chart. Once represented, individual measure points on the chart can be selected and drilled down into by selecting a particular dimension and filtering this. Thus highly relevant data can be extracted. Alternatively a whole chart may be filtered using a user selected dimension.

The configuration data includes the specification of the source Data Table for each Measure; this may be an extracted Data Table, or a table in the existing customer database.

An example of the dimensions which are available to a user to examine for a fault measure are shown on the left hand side of FIG. 1. The internal data extracted to a data table to show this is shown on the right hand side of FIG. 1.

Generation of the Main Database Query

A chart generation engine preferably has the following characteristics:

Accesses the Measure data loaded by the data extraction routines and allow any individual in the customer's organisation to display one or more performance charts pertinent to them in real time.

To allow a user to select or drill down into the constituent part of the data for any chart which contains aggregated data either by a dimension or time.

To alert the user either by the use of colour on a chart or by a configured email alert the existence of a statistically significant event (signal) in the data.

To allow a user to record textual information against a point in a performance chart and to be able to subsequently view that information.

In order to meet the requirement that charts should be generated in a timely manner, an SPC Chart request must be converted into an efficient query e.g. an SQL query (where the data is in an SQL compliant database).

There is an optimised main query format comprising a measure to be extracted, and any user selected dimensions associated with that measure. Measure and dimension data to be used in generating the query are stored in the configuration data.

To minimise the amount of data passed between the database and a query server, the query should also produce the minimum amount of data for each SPC Chart point (typically a single row from a single query e.g. a single co-ordinate pair for a single data point).

The form of the query should be such that the Database System is able to produce an efficient execution plan; this will generally include the use of indexes. In order for this to happen, indexes on all dimension columns in Data Tables are required. Indexes are also placed on some columns in the table describing the Dimension Hierarchies.

An SPC Chart request includes the following information:
The Measure to be displayed
This allows the following to be determined:
a) The Data Table from which to read the Measure Data, FIG. 2 gives examples of Data Tables.
b) The expression to use to extract the Measure value from a row in this Data Table
c) The expression to use to extract the Date (or other datum) value from a row in this Data Table (<datum-SQL>)
d) The Partitioner to use: How to partition the data rows (by day, month, year, etc.)
e) The Time Reducer to use: How to combine values in a Partition over time (sum, mean, etc.)
f) The Hierarchy Reducer to use: How to combine values after Time Reduction, to aggregate over a Dimension Hierarchy The Selections in the Dimension Hierarchies There is a matrix of SQL expressions, which describes how to get the value for each of the Dimensions from each of the Data Tables being used; this is defined as part of the configuration data. For example, if we have Dimensions Location, Engineer, and Fault Type, and we have Data Tables FaultData and PipelineData (See FIG. 2), we might have the following:

| Dimension SQL | FaultData | PipelineData |
| --- | --- | --- |
| Location | cLocId | cLocationId |
| Engineer | cEngId | |
| Type | cTypeId | cTypeId |

To get the value for Location from FaultData, the SQL expression cLocId is used. To get the value for this dimension from PipelineData, the expression cLocationId is used. Which table, FaultData or PipelineData, is used depends on the particular measure to be displayed, note that PipelineData does not have a value for the Engineer Dimension and so a measure derived from this table cannot be filtered by the Engineer dimension.

Multiple selections within a Dimension are interpreted as a disjunction (i.e. 'OR'). The resulting 'OR' expressions from all Dimensions are then 'AND' ed.

The Dimension Hierarchies are represented by the following Database Table, with one row for each node. There is a single root node grouping the Dimension nodes, which may be in further subgroups for convenience.

SfnDimensionHierDesc

| Column Name | Data Type | Indexed | Notes |
| --- | --- | --- | --- |
| cDesc | varchar(255) | N | Description of a node in the Organisation Hierarchy |
| cId | varchar(255) | Y | Unique Hierarchy-Encoded ID for this node. |
| CBaseId | varchar(255) | Y | Attribute value - may be NULL if no data ever matched by this node |
| dFrom | Datetime | N | Time when cBaseId starts to relate to cId |
| To | Datetime | N | Time when cBaseId ceases to relate to cId |
| bIsGroup | number | N | 1 if this is a Grouping Node, 0 otherwise |

Hierarchy-Encoded IDs describe the path to a node. For example, A.B.C.% is a child of A.B.%, which is a child of A.%, which is a child of the root %. This is further shown in FIG. 1, the left hand side of the diagram shows the user view of the hierarchy, the right hand side of the diagram shows the hierarchy-encoded ids in the column cId.

The Attribute value, held in cBaseId, is the value used to match this node against a row of data, by calculating the Dimension value for the Dimension of which this node is a descendent. For example, suppose that just the Location-a node is selected in the Dimension Hierarchy, and a chart is requested for a Measure that gets its data from the table FaultData. The cbaseId value for Location-a is N2-a, and this node is a descendent of the Dimension Node Fault Location. Values for this dimension are defined as coming from the column cLocId for Data Table FaultData, so a filter condition on the data from the FaultData table is created to implement the selection as follows:

cLocId='N2-a'

(see below for more complete examples).

A node can be marked as only being active over a certain date range [dFrom, dTo). NULL values in either column indicate no start or no end date respectively. This allows 'relocation' of nodes at a particular date (e.g. employee moving from one office to another).

Supposing the Dimensions are as shown in FIG. 1, and a Measure is selected which has the same Reducer specified for Time and Hierarchy (this applies to the Faults Reported and Av. Time to Fix Measures in FIG. 1).

The query generated will be in the same general format irrespective of the user request and in this example will have the following form:

```
SELECT <pointIdSQL(<datumSQL>)> AS nPointId__,
       <red(<measSQL>)>         AS nRedValue__
FROM FaultData D__,
     SfnDimensionHierDesc H__1,
     SfnDimensionHierDesc H__2
WHERE
     ---- Conditions relating to selections in
Location Dimension
         (H__1.cId LIKE 'L.N.1.%' OR H__1.cId LIKE
'L.N.2.a.%')
     AND H__1.cBaseId = cLocId
     AND (H__1.dFrom IS NULL OR H__1.dFrom <=
<datumSQL>)
     AND (H__1.dTo   IS NULL OR H__1.dTo >
<datumSQL>)
     ---- Condition relating to selections in
Engineer Dimension
     AND (   cEngId = 'Eng1' AND <datumSQL> >=
'2002-01-01'
         OR cEngId = 'Eng2' AND <datumSQL> <
'2001-08-04')
     ---- Conditions relating to selections in Fault
Type Dimension
     AND H__2.cId LIKE 'T.M.%'
     AND H__2.cBaseId = cTypeId
     AND (H__2.dFrom IS NULL OR H__2.dFrom <=
<datumSQL>)
     AND (H__2.dTo   IS NULL OR H__2.dTo   >
<datumSQL>)
     AND <datumSQL> IS NOT NULL
GROUP BY <pointIdSQL(<datumSQL>)>
ORDER BY 1
```

(Bold text denotes identifiers and values specific to the example Dimension Hierarchy and Measures)

<pointIdSQL(<datumSQL>)> is a SQL expression to get an integer value from the <datumSQL> such that consecutive partitions (e.g. days) give increasing consecutive values.

The form of this SQL depends on the Partitioner specified for the Measure.

<red(<measSQL>)> is a SQL aggregate expression, which 'reduces' the set of values, obtained by evaluating <measSQL> for all of the selected rows, to a single value. This is typically a SUM or MEAN.

The form of this SQL depends on the Reducer specified for the Measure.

Depending on the Measure selected, the following values would be used:

|  | Fault Count | Av. Time to Fix |
|---|---|---|
| <measSQL> | 1 | dFix - dReport |
| <datumSQL> | dReport | dFix |
| <red(<measSQL>)> | SUM(1) | AVG(dFix - dReport) |
| <locDimSQL> | cLocId | cLocId |
| <engDimSQL> | cEngId | cEngId |
| <typDimSQL> | cTypeId | cTypeId |

Because non-leaf nodes are selected in the Fault Location and Fault Type Dimensions, and such nodes could, in principle have many thousands of descendents, the table SfnDimensionHierDesc is used to specify relationally which nodes to match. There are two instances of this table, one for each such Dimension.

Because only 'leaf' nodes are selected in the Engineer Dimension in the example selection of FIG. 1, we do not need to use the table SfnDimensionHierDesc; we can produce an enumerated check. In this case, only when non-NULL dFrom/dTo values exist is a check on the <datumSQL> included.

For some data, it is not appropriate to use the same Reducer over one of the Dimensions as it is over Time. An example of this is data representing the number of faults still 'open' at midnight every day. We would certainly want to add these up as we go up the Location Hierarchy, so that we can see the total number of faults in the Pipeline for a whole Region, for example. However, if we want to have one point per week, we do not want to add up all the daily values, since a fault will often be in the Pipeline for all of those days; we don't want to count this more than once. The sensible thing to do is to take the MEAN of all the daily values in this case (i.e. use MEAN to reduce over time). We then add up all the MEAN values as we go up the Fault Location Hierarchy. But what about the Fault Type Hierarchy? We must collapse all values, for a given (date, Location) pair, in this Dimension (and in general in all non-Primary Dimensions), by adding them, before taking the MEAN over time. Failure to do this will lead to incorrect results. Consider the case where, on Monday of one week, there are 10 Cabling faults and 20 Mountings faults for a particular Location, and on Tuesday there are 20 Cabling faults and 30 Mountings faults for the same Location. If we take the MEAN of all of these, we get 20, whereas if we take the MEAN of (10+20) and (20+30) we get 40.

If a different Reducer is specified for the Hierarchy, the query form is less optimised, using derived tables to effect a three-phase reduction. There is a single Dimension (the Primary Dimension) over which the Hierarchy Reducer is applied; other Dimensions get 'collapsed' in the inner-most Derived Table before Time Reduction occurs.

For example, in the Pipeline of outstanding Faults Measure, SUM is specified as the Hierarchy Reducer, and MEAN as the Time Reducer. The query below relates to the Dimension Hierarchy selections in FIG. 1 except that no Engineer is selected (there is no data on Engineer in the PipelineData table). The Fault Location Dimension is the Primary Dimension.

```
SELECT nPointId__Time                       AS
nPointId__,
       SUM(nRedValue__Time)                 AS
nRedValue__
FROM (
     SELECT <pointIdSQL(<nPointId__Dim>)>   AS
```

```
       nPointId_Time,
               AVG(nRedValue_Dim)      AS
       nRedValue_Time,
               id_Dim
       FROM (
               SELECT dPipeline        AS
       nPointId_Dim,
                      SUM(nPipeline)   AS
       nRedValue_Dim,
                      H_1.cId          AS
       id_Dim
               FROM PipelineData D_,
                    SfnDimensionHierDesc H_1,
                    SfnDimensionHierDesc H_2
               WHERE
                   ---- Fault Location Dimension
                   (H_1.cId LIKE 'L.N.1.%' OR H_1.cId
       LIKE 'L.N.2.a.%')
                   AND H_1.cBaseId = cLocationId
                   AND (H_1.dFrom IS NULL OR H_1.dFrom <=
       dPipeline)
                   AND (H_1.dTo   IS NULL OR H_1.dTo  >
       dPipeline)
                   ---- Fault Type Dimension
                   AND H_2.cId LIKE 'T.M.%'
                   AND H_2.cBaseId = cTypeId
                   AND (H_2.dFrom IS NULL OR H_2.dFrom <=
       dPipeline)
                   AND (H_2.dTo   IS NULL OR H_2.dTo  >
       dPipeline)
                   AND dPipeline IS NOT NULL
               GROUP BY dPipeline, H_1.cId
               ) DT_DIM
           GROUP BY <pointIdSQL(<nPointId_Dim>)>, id_Dim
           ) DT_TIME
       GROUP BY nPointId_Time
       ORDER BY 1
```

(Bold text denotes identifiers and values specific to the example Dimension Hierarchy and Pipeline Measure)

Here, the derived table DT_DIM contains a value (reduced over all Dimensions except the Primary Dimension) for each distinct <date, hierarchy node> pair for nodes at or below RegionN1 or Location-a whose cBaseId matches the cLocationId value in one of the rows in the Pipeline Datatable.

The derived table DT_TIME reduces these to a single value for each distinct <partition, hierarchy node> pair, by combining the values for all <date, hierarchy node> pairs where the date values fall into the same partition. This is done using the Time Reducer. Here, a partition may mean day, month, year, etc. depending on the Partitioner used.

Finally a single value for each partition is produced by the main SELECT, by combining the values for all <partition, hierarchy node> pairs with the same partition value. This is done using the Hierarchy Reducer.

A Suite of Performance Charts Based on Statistical Process Control (SPC)

The following suite of charts are preferably required. These charts provide the information for user and management action and are based on SPC.

Dial
  An indicator giving the current value of a particular Measure shown against the expected range of values that Measure may take. If the Measure value is outside the expected values or the underlying time series data has a current signal then the dial alerts the user by a significant change of colour to indicate a "good" or "bad" signal.
  The range of values a Measure may take is determined by Statistical Process Control (SPC) calculations performed on the underlying time series data held for the Measure.
  A signal in the underlying time series means there has been a run of eight data points either below or above the mean.

Schart
  An schart is an enhanced SPC chart. It shows the Measure value on the y axis changing over time which is plotted on the x axis together with three calculated lines—the mean, the upper process guideline and the lower process guideline (both calculated at three standard deviations from the mean).
  Key enhancements to this chart include:
    The ability to set a Process Break for any point on the chart. The SPC lines are recalculated from the Process Break
    The ability to model in the SPC lines seasonality or cyclicity
    The ability to model a trend in the SPC lines
    The ability to annotate any point Benchmark Chart
  A Benchmark chart which shows the SPC values (mean and upper/lower process guidelines) for a particular measure and selected dimension value. This allows comparison of variability (the SPC process guidelines) and the performance (SPC mean line) over multiple dimension values in one chart.

Pareto Chart
  A Pareto chart which shows the distribution of data for a particular Measure over a selected dimension.

Stacked Pareto Chart
  A Stacked Pareto chart which shows the distribution of data for a particular Measure over two selected dimensions.

Data Chart
  The Data chart displays the raw data in a tabular form for a particular chart or chart point.

The system supports different types of user by assigning roles to a user of the system.

The following are defined when setting up a user:
Username
Password
Email Address (optional)
Initial Dashboard to be seen on logging in
Restriction on visibility within a dimension (optional)
Roles Roles are set up separately, and consist of a set of Privileges and a set of Measures available to that Role.

Any number of Roles may be assigned to a user, specifying the Privileges and Measures available to them.

The following Privileges are available:
Admin Allows creation/modification/deletion of configuration objects such as Measures and Dimiensions
Alerts Allows a user to be alerted when signals on watched charts occur
Analyse Stats Allows additional statistical information to be displayed
Annotate Allows sChart points to have text added to them
Full Drilldown Without this, the only drilldown available is the sCharts behind a Dashboard
Modify Allows sCharts to be modified—e.g. process breaks added
Personal Charts Allows a personal version of sCharts to be created for 'what if?' use
Stress Test Allows stress testing of the environment to be carried out to assess performance
Supp Charts Allows supplementary charts (e.g. Moving Average) to be displayed with sCharts
Targets Allows Targets to be added/changed/deleted
User Admin Allows users to be created/deleted/edited
View Charts Without this no charts can be viewed View Explorer Without this, the Measure and Dimension Explorers are not displayed In addition, a user may choose to hide certain dials from a given dashboard.

The system provides a specific number of graphical representations of data that enable a business user to understand and analyse their activity interactively in a way that they have not been able to previously. These include A cyclical SPC chart based on a 52 week cycle combined with the ability to forward project the data. This enables the user to analyse the cyclical nature of demand on a week by week basis throughout the year and to establish the extent to which this is stable. This facility has the added feature of allowing the user to select the day of the week to which the 52 week cycle will apply in the current year which is important for planning purposes. This feature can be set as the default behaviour by an administrator during configuration of the system on a measure by measure basis. A user can override the default setting when viewing the chart.

A cyclical SPC chart based on a 168 hourly cycle within a week which enables the user to analyse the variability of activity on an hour by hour basis. This is of particular importance in developing resource plans when it is essential to ensure that there is always adequate resource to meet demand. The use of the 168 day cyclical chart provides the user with a statistically robust method of calculating the probability of demand exceeding the upper control limit of the chart separately for each hour of the week. This feature can be set as the default behaviour by an administrator during configuration of the system on a measure by measure basis. A user can override the default setting when viewing the chart.

The ability to present Pareto charts in the order in which activity occurs by linking the order of the Pareto chart to the order of the selected measure. For example, this allows the user to see performance by the hour of day according to which hour has the highest level of activity. This feature is selected by the user when the charts are viewed.

The ability to display an SPC chart that shows activity and performance in a particular time period by hour of day. This is of particular value in pinpointing the precise circumstances that have given rise to performance issues. This feature is selected by the user when the charts are viewed.

The ability to order benchmark charts by value, mean or variability. This enables the user quickly to identify those individuals or operating units that are performing well or poorly and where management interventions are likely to have the greatest impact. This feature is selected by the user when the charts are viewed.

The ability to present data that has been selected by the user geographically through an online link to a mapping solution. The combination of sfn's graphical representation of data with the ability to represent the selected data geographically is of particular value to organisations that have to respond to customer demand in the customers own locality. This feature can be configured by an administrator on a Data Table with location data.

The ability to analyse business performance relative to targets. In particular, the system allows targets to be adjusted to show the effect of cyclical variation. This is particularly valuable for businesses that display significant seasonal variability in demand and performance. A target is configured for a chart by a user and automatically tracks the cyclical variation.

The way that the system allows users to undertake the interactive analysis of performance data is critical to the design and implementation of a structured process for managing performance.

Preferably the system is configured such that:

The system is available to all individuals who have an impact on the performance of the business area to be improved Each individual can see the data that they are personally responsible for The Performance Improvement Analysts in the business can see and interrogate all areas of the business using the charts provided by the system.

User Analysis of Performance

All users can view the charts and are able to undertake additional interactive drilldown and investigation of the data in the charts as follows:

For control charts, this can be done by inserting process breaks, trends and cyclical patterns into control charts, changing the time partition for the chart, analysing individual points on a chart, analysing regions on a chart, undertaking Pareto or Benchmark analysis of the data in the chart by selecting from a list of data Dimensions (drilldown), viewing the underlying data form.

For Pareto and benchmark charts this can be done by viewing the control chart that relates to an individual bar on a Pareto or Benchmark chart, reordering the Pareto or Benchmark chart (eg by ascending or descending order, by ascending or descending variability etc), simultaneously viewing all the control charts that relate to every bar on the Pareto or Benchmark chart, undertaking additional Pareto or Benchmark analysis of any of the bars in the Pareto or Benchmark chart by selecting from a list of data Dimensions (drilldown).

The system allows users to undertake interactive investigation and analysis of performance data which is the key component that enables the performance management process. The process is structured around a sequence of structured performance management meetings that occur on a regular basis at different levels within the organization. Participation at the meeting consists of the manager of the area together with the key people responsible for delivering performance in their area. Each meeting starts with a review of the information from the system to establish the impact of improvement initiatives already undertaken and the key factors that are affecting performance. The issues that have been identified from the system are then reviewed and discussed and the participants are then required to agree the key actions which they are able to take in order to address the issues identified. The use of the same SPC-based presentation of data from the system together with the same meeting structure at all performance management meetings throughout the organization is a critical factor in ensuring that there is a common approach to performance management and a common understanding of the information and its implications.

The systematic behaviour of each role in the business to identify signals and take action is as follows:

The front line user role:

The system presents data to the front line user through the configurable interface that ensures that the user will initially see just those particular charts and data items that are relevant to their own area of activity. These relate to those activities that have previously been identified as important to the overall performance of the organisation and which the user is responsible for managing and improving. The charts are refreshed every time the system is updated to show the user the most recent view of performance in their business area. In the event that there is a signal in a chart or an issue that the user needs to investigate further the user will then drilldown to find the underlying causes of the change by clicking on the chart and exploring the data using the full range of functionality in the system. The front line user will respond to the information by initiating appropriate action to address the issue identified and can then add comments to charts that explain the changes in performance that are highlighted in the SPC charts and the actions taken.

The system presents data to a manager either through the configurable interface or through the system dashboard. The SPC functionality in the system highlights those areas of activity where performance has moved away from the norm and that require attention. A manager is then able to drilldown through the user interface to see the performance of their division and of each of the sub sectors for which they are responsible, to undertake their own analysis of the factors affecting performance and to review the annotations that have been added to the system by the front line users to explain changes in performance. This analysis forms the basis for the regular performance review meetings that are conducted between the manager and the front line users.

A performance analyst supports the manager by preparing the information that is discussed at the performance meetings and supports front line users by helping to undertake more complex analysis of the factors affecting performance across the organisation. This will include:
- the analysis of the trends in activity affecting the business area using the seasonal and cyclical functionality in the system to ensure that the existing capacity is sufficient to meet the demand.
- the analysis of trends in faults or exceptions using pareto analysis to identify geographic, temporal or staff factors that are systemically giving rise to particular issues or problems
- the analysis of process cycle times using SPC charts and Pareto analysis to identify where the capability of the process to meet demand may be changing, and process redesign may be required
- the analysis of the variability in the performance of teams and individual staff members using benchmark charts to identify where opportunities may exist for skills transfer or for staff training to improve performance
- the analysis of the impact of previous improvement initiatives using SPC analysis to establish whether they have had the anticipated impact in the area concerned, to check that they have not had unintended consequences in other areas and to identify where further refinement may be required Subsequent to any management intervention, Management continually reviews the performance of the business against the actions taken to ensure the desired improvement in performance is achieved and maintained.

Caching and Auto-caching

In order to speed up the accessing of frequently used SPC charts the results of SPC chart queries are stored in cache memory and these results are reused whenever the same query is generated. This is a much faster computation than rerunning the query against the database.

The caching system works by associating a raw query string with the results found by that query. The cache is checked before passing the queries to the database and if a match is found the associated results are used and no database interaction occurs.

A flow diagram showing the cache query is shown in FIG. 3. In FIG. 3 the process of adding a new chart to cache is shown. In this, a determination is made as to whether or not the cache is full. If it is, the oldest entries are removed and a new entry is written.

In FIG. 3b the process of adding a computationally expensive cache is shown. A determination is made as to whether or not the query was computationally expensive. If it was, it is added to an autocache list and provided it is more expensive than other charts in the autocache list.

In FIG. 3c a chart query is shown. In this, a request for a chart generates a query. The system determines firstly whether or not a cached chart is available. If it is, then it can be used. However, if the data table for the chart has changed the chart is invalid and must be requeried and subsequently stored in the cache before it can be accessed.

Cache integrity has to be maintained. Whenever a data table in a database becomes updated, any cache results based on that data table become invalid. Therefore, with each cache entry the name of the data table from which the results were selected and the time the results were read are stored. Each data table registered for use with the system then has a row in the following database table.

System Datatables

| Column name | Data Type | Notes | Null | Key |
| --- | --- | --- | --- | --- |
| cDataTable | varchar(255) | The name of the Data Table. | | P |
| dUpdateStart | datetime | Time at which the last update for this Data Table started. NULL initially. | Y | |
| dUpdateEnd | datetime | Time at which the last update for this Data Table ended. NULL initially and when update is in progress. | Y | |
| bEnableQueryCaching | number(1) | 1 if queries against this Data Table are to be cached for use with future chart requests. | | |
| bEnableAutoCaching | number(1) | 1 if 'expensive' queries against this Data Table | | |

-continued

| Column name | Data Type | Notes | Null | Key |
|---|---|---|---|---|
| | | are to be recorded in SfnAutoCacheList so that they will be 'autocached' on Data Table update or server restart. (See later section). | | |

Before a Data Table is updated, the value of dUpdateStart must be set to the current time, and dUpdateEnd must be set to NULL. This signals to the system that queries against that Data Table cannot be made at the moment, although the caching system's contents are still considered valid, and can be used. Once the update is complete, dUpdateEnd must be set to the current time, to signal that queries against this Data Table can once again be made, and the caching system's contents for queries against this Data Table are no longer valid (see Data Table Update Protocol in FIG. 3). This is checked just before looking up the generated query in the cache, and if necessary, all entries in the cache are deleted, and the current lookup will fail, leading to running the query in the database (if dUpdateEnd is not NULL) or giving an error (if it is NULL). The protocol of setting the dUpdateStart and dUpdateEnd values may be impossible to implement for some Data Tables (e.g. when data updates are carried out by an external system that cannot be changed), in which case the value of bEnableQueryCaching is set to 0, and no caching is used for this Data Table. bEnableAutoCaching is used by AutoCaching, as described in a separate section below.

There are other instances where the cache is no longer valid. These occur when changes are made to the definitions of Dimension Hierarchies. The generated query will often refer to a point in a Dimension Hierarchy that has children. If one of these children is deleted, or a new child added, the same query might produce a different result. Consequently, such operations clear the cache.

Treatment of Time-dependent SQL

Also a query might contain a condition stating that only data relating to the last 3 hours is to be selected. This is time-dependent in the sense that the results for this query will depend on the time at which it is applied. Clearly such results cannot be cached, as they will be immediately out of date, breaking the requirement for integrity.

To overcome this problem, the SQL is examined for time-dependent functions, and if any are found, the Caching system is not used.

However, this alone would be far too restrictive. Supposing the condition were that only data relating to times before the current year were to be considered. Results of such a query would in fact be valid until the end of the current year. An example of the generic SQL for such a condition is:

WHERE {dsfn DATEPART(Y, dReportDate )} < {dsfn DATEPART(Y, {dsfn NOW( )})}

In the case of Microsoft Access, this gets translated to the following raw SQL:

WHERE DATEPART('.y.y.y.y.', dReportDate) < DATEPART('.y.y.y.y.', NOW( ))

The system will spot the reference to current time (NOW( )), and not be able to use the Caching system. To overcome this, a generic meta-function {dsfn EVAL( . . . )} is added. The argument to this gets evaluated in the database at the time the SQL is translated from generic to raw SQL. This is used as follows:

WHERE {dsfn DATEPART(Y, dReportDate )} < {dsfn EVAL({dsfn DATEPART(Y, {dsfn NOW( )})})}

In the case of Microsoft Access, this gets translated to the following raw SQL (assuming the current year is 2004):

WHERE DATEPART('.y.y.y.y.', dReportDate)<2004

There is no longer any reference to current time, and so the Caching system can be used. Should the year change to 2005 while this result is still in the cache, it will no longer be matched by the raw SQL generated for a new sChart request, which will now contain 2005, and so there is no loss of integrity.

Limiting Cache Size

The cache must not be allowed to grow indefinitely as there are limited memory resources. To overcome this, a configurable limit on the number of cache entries is provided. When this limit is reached, one or more entries must be removed before a new entry can be added (see FIG. 3a). The heuristic chosen is to remove least-recently-used entries (although this is open to configuration). Removing only a single entry would maintain the maximum number of cache entries, but would entail going through the removal process each time a new entry was added, which would be inefficient. For this reason, there is a configurable value specifying the percentage of entries to remove each time the cache fills up.

There is a configurable limit on the number of sChart points allowed in a cache entry; if this is exceeded no cache entry is made. This is because sCharts with millions of points would take an enormous amount of cache memory.

There is also an option to compress the cached results, to save on memory, but the price paid for this is the increased time required to use a cached result.

Synchronizing the Cache

If two users request the same un-cached sChart at the same time, we need to avoid querying the database twice. To do this, the code that implements cache lookup is synchronized such that only one process can populate the cache for any given query string.

The above caching system has the drawback that in certain circumstances the cached values become invalid and have to be cleared. Therefore, subsequent requests of a previously cached chart will require a query of the database which will be computationally expensive and may take some time.

To overcome this, the system embodying the invention automatically re-caches the result of sChart queries made against the database when the previously cached results become invalid as a result of data table updates, or if the server is restarted (see AutoCaching Thread in FIG. 3). This Auto- Caching works as a background process which first runs at startup. After it has completed, it automatically reschedules itself to run again at a later time e.g. one minute, ten minutes, etc. Each time it runs it uses a defined set of information to check whether any autocaching is required. This information can be as follows:

- A table of any sChart queries that took more than a (configurable) threshold time to run. This includes the Data Table to use. This table also contains the last request date.
- A table listing the following for each <Data Table, Application Server> pair:
  - The time the AutoCaching last ran
  - The time the Cache was last cleared
  - This allows the AutoCaching to function in a multiple Application Server environment
- The lower threshold time: sChart queries taking longer than this to run are stored in the AutoCache list. This threshold may be increased, so the AutoCaching system also filters entries against this value when it checks to see which requests to run.
- The upper threshold time: The AutoCaching ignores entries in the AutoCache list whose run time was greater than this. This prevents any pathological queries from causing the AutoCaching to run for too long.

Using this information, an efficient query can be generated to see which requests from the AutoCache list need to be run. It would be possible just to run through the entire AutoCache list each time, since those requests already in the cache would return fairly quickly. However, even if 100 cached requests could be run a second, this would require 10 seconds for an AutoCache list with 1000 entries, which is a significant load on the Application Server if run every minute. By filtering out which requests need to be made, less than a second is typically required when all entries are up-to-date. This meets the business requirement of not overloading the IT infrastructure.

It may be that updates are so frequent for a particular Data Table, that AutoCaching is counter-productive, as it takes too long compared to the update period. In this case, the Data Table is flagged as not allowing AutoCaching (the column bAutoCachingEnabled in table SYSTEM DATATABLES shown in a previous section is set to 0). This prevents overloading the IT infrastructure by constant database requests.

AutoCaching can run on the basis of the most recently requested charts. Alternatively, they can be a predefined set of charts which are always autocached, or it can be a combination of these two factors, ie. a selection of the most recently requested charts and a selection of known frequently requested charts.

It would therefore be appreciated that the forms in a business can be improved by usage of a system embodying the invention. In particular, the system comprises:
- Data extract routines,
- Database structure consisting of measures and dimensions,
- Database update code to automatically maintain the dimensions and measure data,
- Optimise chart clearing engine with auto-caching and server file support,
- Interactive analysis giving drill down to any dimension through any dimension higher or time aggregation,
- A suite charts based SPC charts with enhancements to model cyclisity, model trends, model process breaks,
- Sector specific views of the data.

The system is configured such that the system is available to all individuals who can have an impact on the performance of a business area to be improved. It is preferably configured so that each individual can see only the data for which they are personally responsible. The system is further configured such that performance improvement analysts in the business can monitor and interrogate all areas of the business using charts provided by the system. For each signal identified by the system action may then be taken to identify the cause and plans made accordingly to make identified improvements and eliminate causes of poor performance. A continued review of performance of a business against the actions taken can then be made.

The system is preferably implemented in computer software which draws data from a users database to derive the necessary SPC charts.

The invention claimed is:

1. A system for receiving extracted data from a source database without a need for a data warehouse for subsequent analysis comprising:
   (a) an application server comprising at least one physical processor, the application server configured to:
      (1) obtain extracted data from the source database,
      (2) transform the extracted data into a predefined structure for storage in a storage medium in the form of a single hierarchy table and a plurality of data tables,
         (i) wherein the single hierarchy table defines a plurality of dimension hierarchies each having a different tree structure of nodes, wherein each node in the plurality of dimension hierarchies is uniquely identified by a node key comprising a concatenation of an identifier for the each node and an identifier for any node above the each node in one of the plurality of dimension hierarchies, wherein the node keys are usable to define any number of dimensions in the plurality of dimension hierarchies, and wherein each node in the plurality of dimension hierarchies further comprises an existing attribute,
         (ii) wherein each of the plurality of data tables is in the form of a single table having a plurality of columns and a plurality of rows, and wherein each of the plurality of rows in the plurality of data tables comprises at least one node key and at least one item of data,
         (iii) wherein storage of dimension information of the single hierarchy table is separate from storage of data of the plurality of data tables in such a way that the plurality of dimension hierarchies can be modified, including the addition of hierarchy levels, with no change to database schema or data, thereby producing a more maintainable database, and
      (3) populate a row in one of the plurality of data tables with the transformed data and a node key associated with the transformed data;
   (b) a set of measures for interrogating the data tables, each measure of the set of measures having associated therewith one or more dimensions for filtering the transformed data, wherein each of the one or more dimensions can be referenced by each of the plurality of data tables using a node key associated with each of the one or more dimensions, and wherein a given data table can be filtered by joining the single hierarchy table to the given data table using the existing attribute associated with the node key and filtering the hierarchy table by a portion of the node key; and
   (c) a user controllable interface configured to receive a user selection of one or more dimensions to be used to filter a measure from the set of measures and provide an output representative of the filtered measure;
   wherein the notation for a child node comprises an identifier of a parent node and an identifier of the child node, wherein the identifier of the parent node and the identifier of the child node are separated by at least one separating character that is not an operator.

2. A system according to claim 1, wherein the data in the storage medium in the form of a single hierarchy table and a plurality of data tables can be filtered using at least a portion of a node key.

3. A system according to claim 1, wherein the notation for the child node further comprises one or more identifiers of one or more intermediate nodes, wherein the identifier of the parent node and the one or more identifiers of the one or more intermediate nodes are separated by the at least one separating character, and wherein the one or more identifiers of the one or more intermediate nodes and the identifier of the child node are separated by the at least one separating character.

4. A system according to claim 3, wherein the at least one separating character comprises a period.

5. A method for receiving extracted data from a source database without a need for a data warehouse for subsequent analysis comprising:
   obtaining, by an application server, extracted data from the source database;
   transforming, by the application server, the extracted data into a predefined structure for storage in a storage medium in the form of a single hierarchy table and a plurality of data tables, wherein the single hierarchy table defines a plurality of dimension hierarchies each having a different tree structure of nodes, wherein each node in the plurality of dimension hierarchies can be uniquely identified by a node key comprising a concatenation of an identifier for the each node and an identifier for any node above the each node in one of the plurality of dimension hierarchies, wherein the node keys are usable to define any number of dimensions in the plurality of dimension hierarchies, wherein each of the plurality of data tables is in the form of a single table having a plurality of columns and a plurality of rows, wherein each of the plurality of rows in the plurality of data tables comprises at least one node key and at least one item of data, wherein storage of dimension information of the single hierarchy table is separate from storage of data of the plurality of data tables in such a way that the plurality of dimension hierarchies can be modified, including the addition of hierarchy levels, with no change to database schema or data, thereby producing a more maintainable database, and wherein each node in the plurality of dimension hierarchies further comprises an existing attribute;
   populating, by the application server, a row in one of the plurality of data tables with the transformed data and a node key associated with the transformed data;
   receiving, by the application server via a user controllable interface, a user selection of one or more dimensions to be used to filter a measure from a set of measures, wherein each measure of the set of measures has associated therewith one or more dimensions for filtering the transformed data, wherein each of the one or more dimensions can be referenced by each of the plurality of data tables using a node key associated with each of the one or more dimensions; and
   providing, by the application server via the user controllable interface, an output representative of the filtered measure;
   wherein the notation for a child node comprises an identifier of a parent node and an identifier of the child node, wherein the identifier of the parent node and the identifier of the child node are separated by at least one separating character that is not an operator; and
   wherein a given data table is filtered by joining the single hierarchy table to the given data table using the existing attribute associated with the node key and filtering the hierarchy table by a portion of the node key.

6. A method according to claim 5, wherein the data in the storage medium in the form of a single hierarchy table and a plurality of data tables can be filtered using at least a portion of a node key.

7. A non-transitory memory having instructions embodied thereon for receiving extracted data from a source database without a need for a data warehouse for subsequent analysis, the instructions comprising:
   instructions to obtain, by an application server, extracted data from the source database;
   instructions to transform, by the application server, the extracted data into a predefined structure for storage in a storage medium in the form of a single hierarchy table and a plurality of data tables, wherein the single hierarchy table defines a plurality of dimension hierarchies each having a different tree structure of nodes, wherein each node in the plurality of dimension hierarchies can be uniquely identified by a node key comprising a concatenation of an identifier for the each node and an identifier for any node above the each node in one of the plurality of dimension hierarchies, wherein the node keys are usable to define any number of dimensions in the plurality of dimension hierarchies, wherein each of the plurality of data tables is in the form of a single table having a plurality of columns and a plurality of rows, and wherein each of the plurality of rows in the plurality of data tables comprises at least one node key and at least one item of data, wherein storage of dimension information of the single hierarchy table is separate from storage of data of the plurality of data tables in such a way that the plurality of dimension hierarchies can be modified, including the addition of hierarchy levels, with no change to database schema or data, thereby producing a more maintainable database;
   instructions to populate, by the application server, a row in one of the plurality of data tables with the transformed data and a node key associated with the transformed data;
   instructions to receive, by the application server via a user controllable interface, a user selection of one or more dimensions to be used to filter a measure from a set of measures, wherein each measure of the set of measures has associated therewith one or more dimensions for filtering the transformed data, wherein each of the one or more dimensions can be referenced by each of the plurality of data tables using a node key associated with each of the one or more dimensions; and
   instructions to provide, by the application server via the user controllable interface, an output representative of the filtered measure;
   wherein the notation for a child node comprises an identifier of a parent node and an identifier of the child node, wherein the identifier of the parent node and the identifier of the child node are separated by at least one separating character that is not an operator.

8. A non-transitory memory according to claim 7, wherein the data in the storage medium in the form of a single hierarchy table and a plurality of data tables can be filtered using at least a portion of a node key.

* * * * *